US006553858B1

(12) United States Patent
Kim

(10) Patent No.: US 6,553,858 B1
(45) Date of Patent: Apr. 29, 2003

(54) DETENT MECHANISM FOR SHIFT LEVER UNIT

(75) Inventor: Hyung-Suk Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/685,486

(22) Filed: Oct. 10, 2000

(30) Foreign Application Priority Data

Nov. 5, 1999 (KR) .......................................... 99-48814
Nov. 5, 1999 (KR) .......................................... 99-48815

(51) Int. Cl.[7] ............................................... G05G 9/00
(52) U.S. Cl. .............................. 74/473.18; 74/473.28; 74/527; 74/473.33
(58) Field of Search ...................... 74/471 XY, 479.01, 74/473.18, 473.28, 527, 473.33; 267/155

(56) References Cited

U.S. PATENT DOCUMENTS

| | | | | |
|---|---|---|---|---|
| 4,513,847 A | * | 4/1985 | Hansen | ........................... 192/4 |
| 4,926,172 A | * | 5/1990 | Gorsek | ........................ 341/20 |
| 5,406,860 A | * | 4/1995 | Easton et al. | .................. 74/335 |
| 6,029,537 A | * | 2/2000 | Nagao | ...................... 74/473.33 |
| 6,125,714 A | * | 10/2000 | Woeste et al. | ........... 74/473.18 |

\* cited by examiner

*Primary Examiner*—David A. Bucci
*Assistant Examiner*—Vicky A. Johnson
(74) *Attorney, Agent, or Firm*—Christie, Parker & Hale, LLP

(57) ABSTRACT

A detent mechanism for a dual mode shift lever unit having a shift lever inserted into a housing through a guide groove formed on an indicator panel as an upper part of the housing, and a cable bracket pivotally supported by the housing and connected to a transmission manual valve which is responsively operated by shift lever manipulation, wherein the detent mechanism interposed between the shift lever and a pivot shaft of the cable bracket includes a bracket fixedly connected to a lower end of the shift lever that is pivotally connected to a rotational member which is rotationally mounted on the pivot shaft supported by a shift lever housing, a support member integrally formed on one end portion of the rotational member and extended in an upward direction, and a turnover spring installed onto one open side of the bracket for contacting the support member.

5 Claims, 13 Drawing Sheets

DETENT MECHANISM FOR SHIFT LEVER UNIT

BACKGROUND OF THE INVENTION (a). Field of the Invention

The present invention relates to a dual mode shift lever unit for an automatic transmission, and in particular, to a detent mechanism for a dual mode shift lever unit having automatic and manual modes capable of enhancing detent quality while in mode conversion.

(b). Description of the Related Art

Recently, high class automobiles have tended to be equipped with a dual mode transmission shift mechanism for satisfying driver's whimsical tastes to sometimes take the pleasure of manually shifting the transmission like a sports car, and sometimes to enjoy ride quality of an automatic operation of a high class sedan.

This kind of dual mode shift mechanism provides two shift modes, i.e., an automatic mode and a manual mode, such that an indicator panel is formed having a guide groove separating respective mode portions.

FIG. 1 is a top plane view showing a presently used indicator panel. FIG. 2 and FIG. 3 are respective side elevation and internal perspective views of a dual mode shift lever unit which is presently used, and FIG. 4 is a perspective view of a shift lever of the dual mode shift lever unit as presently used.

As shown in FIG. 2, the dual mode shift lever unit comprises a shift lever 2 inserted into a housing 1 through a guide groove formed on an indicator panel at an upper part of the housing 1, and a cable bracket 3 which is pivotally supported by the housing 1 and connected to a transmission manual valve (not shown) by a cable (not shown) such that the transmission manual valve is responsively operated by shift lever manipulation.

In terms of mode conversion, the shift lever 2 moves in widthwise directions in relation to the vehicle's direction of travel at a D range. Normally, the shift lever 2 is located in automatic mode in which the shift lever is connected to the cable bracket 3 by engaging a pin 4 formed on the shift lever 2 with a pinhole 5 formed on the cable bracket 3 such that the shift lever can move to and fro along an automatic mode groove by driver's manipulation.

To convert the mode to the manual mode, the shift lever 2 moves in an opposite side direction at the range D in order for the pin of the shift lever to be disengaged from the pinhole of the cable bracket 3.

FIG. 3 shows that under the indicator panel a guide rail 6 is fixedly mounted along the automatic mode portion and has a guide groove 7 such that a guide projection 9 having an L-shape, downwardly bent on one side of the shift lever 2, is guided along the guide groove 7 of the guide rail 6 during range shifting in automatic mode.

Also, the shift lever 2 is provided with a detent mechanism (see FIG. 4) at it lower end portion so as to provide detent quality when changing the mode from automatic mode to the manual mode or vice versa.

As shown in FIG. 4, the detent mechanism comprises a bracket 240 having a pair of parallel arms 251 formed in a middle portion thereof and fixedly mounted to the lower end of the shift lever 2 at its upper end and pivotally connected to a rotation member 250, which also pivots on a pivot shaft 245 such that the shift lever can pivot in front, rear, left, and right directions; and a detent block 253 pivotally connected to the bracket 240 at it's lower portions by a pin 254 crossing between two opposite walls of the bracket 240 and biased to a bar 252 installed between the parallel arms 251 of the bracket 240 by a coil spring 256 which is supported by a support 260 integrally formed with the rotation member 250 such that the detent block 253 is hooked to the bar 252 at one of two recesses 255 formed on the detent block vertically arranged with respect to the pivot shaft 245.

Practically, while the shift mode is converted from the automatic mode to the manual mode, i.e., the bracket 240 pivots to push the detent block 253, the detent block 253 moves to overcome a biasing force of the coil spring 256 such that the bar 252 slides down to engage with a lower recess.

However, this dual mode shift lever unit has drawbacks in that the coil spring for elastically biasing the detent block is unstable so as to be easily deviated from its place resulting in degraded detent quality.

SUMMARY OF THE INVENTION

The present invention has been made in an effort to solve the above problems of the prior art.

It is an object of the present invention to provide a dual mode shift lever unit capable of providing a reliable detent quality during a mode conversion operation, and to provide durability by simplifying the structure of a detent mechanism.

To achieve the above object, the detent mechanism for a dual mode shift lever unit comprises a bracket fixedly connected to a lower end of the shift lever and pivotally connected to a rotational member which is rotationally mounted on a pivot shaft supported by a shift lever housing, a support member integrally formed on one end portion of the rotational member and extended in an upward direction, and a turnover spring installed onto one open side of the bracket for contacting the support member.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

Figure 1:
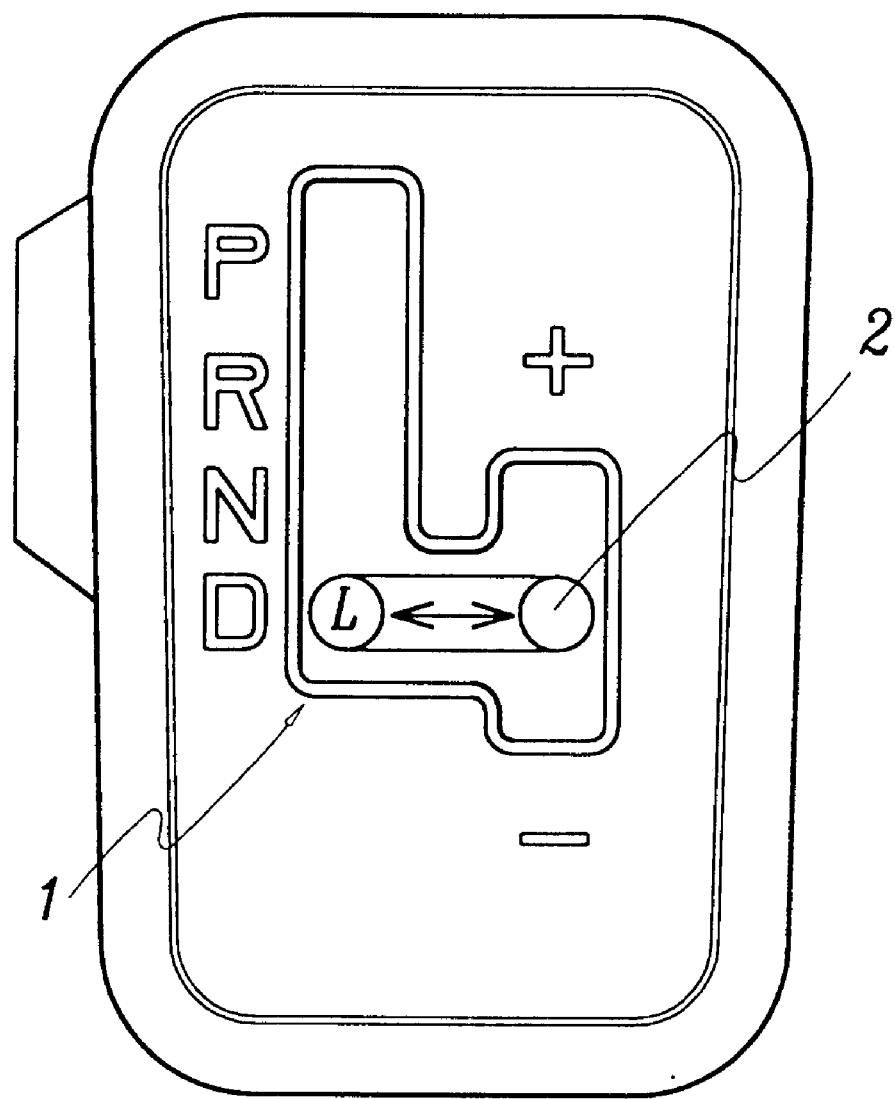
FIG. 1 shows an indicator panel of a presently used dual mode shift lever unit.
Figure 2:
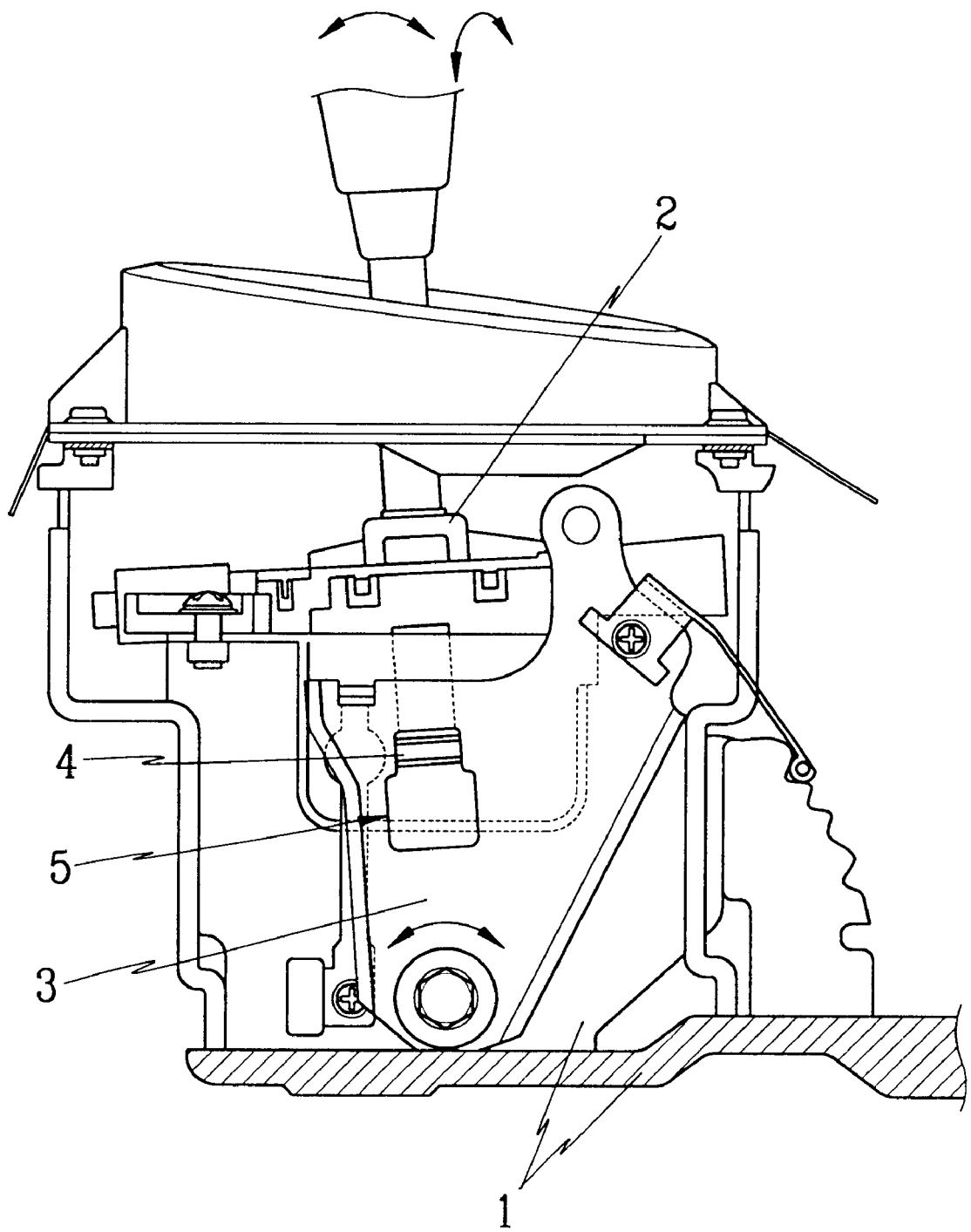
FIG. 2 is a side elevation view of a conventional dual mode shift lever unit.
Figure 3:
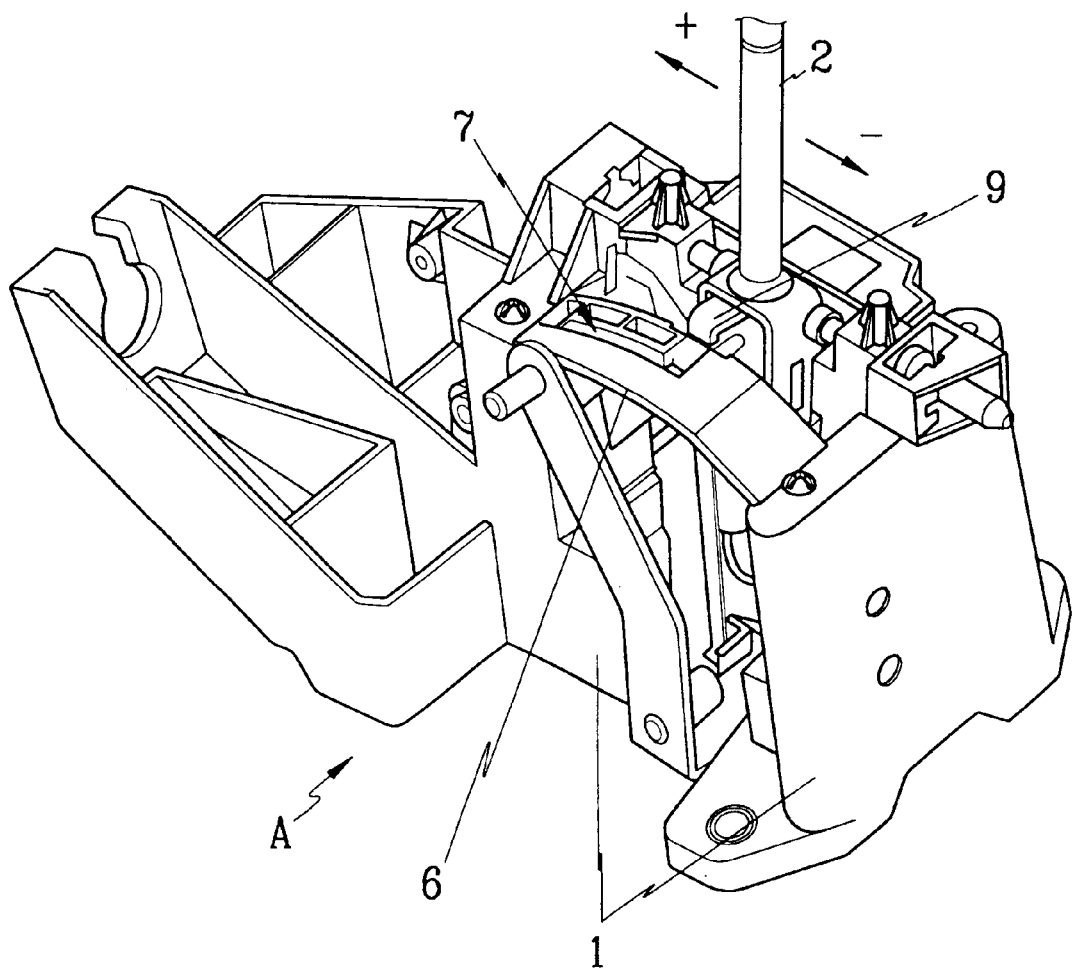
FIG. 3 is a perspective view of the conventional dual mode shift lever unit of FIG. 2.
Figure 4:
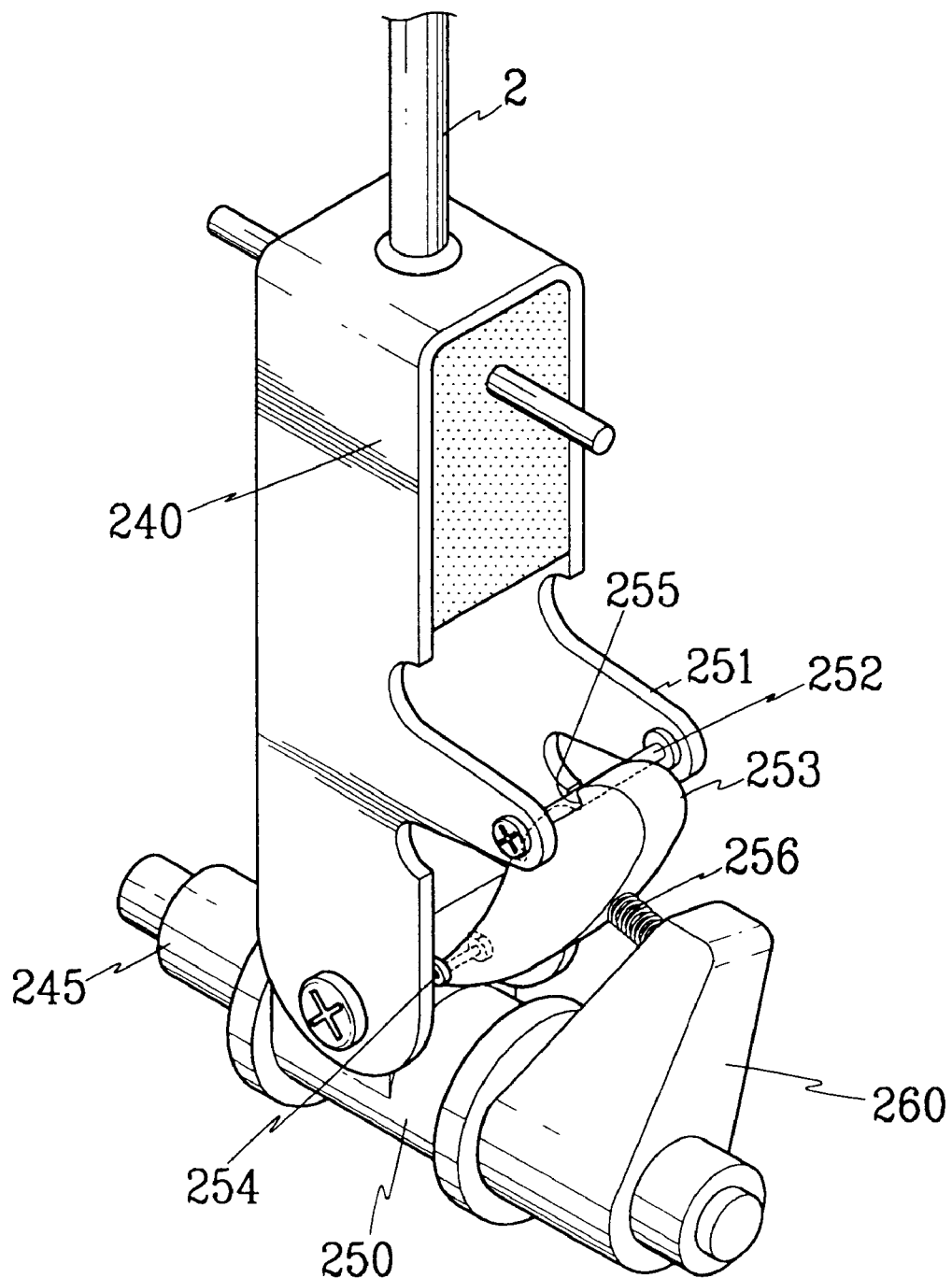
FIG. 4 is a perspective view of a detent mechanism of the conventional dual mode shift lever unit of FIG. 2.

In this specification, not all the feature of a dual mode shift lever unit of the present invention will be explained but rather it will focus on the detent mechanism thereof, and the reference numerals in FIG. 1, FIG. 2, and FIG. 3 will be used to explain the present invention because the features in these drawings are common with the present invention.

A detent mechanism for a dual mode shift lever unit according to a first preferred embodiment of the present invention will be described hereinafter with reference to the accompanying drawings.

Figure 5:
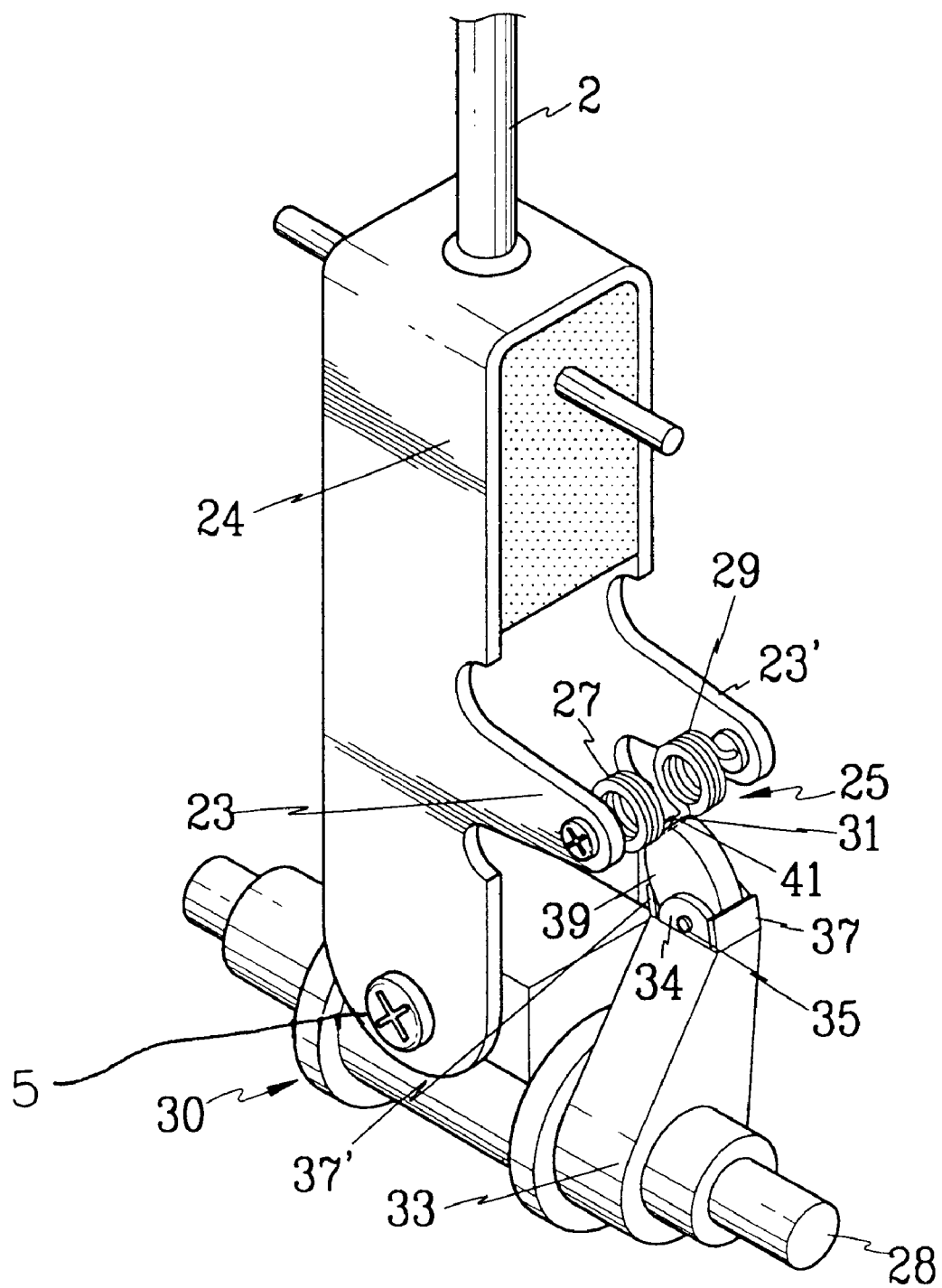
FIG. 5 is a perspective view of a detent mechanism according to a first preferred embodiment of the present invention.

FIG. 5 is a perspective view of a detent mechanism according to a first preferred embodiment of the present invention.

As shown in FIG. 5, the detent mechanism comprises a bracket 24 fixedly connected to a lower end of a shift lever 2 and pivotally connected, via a pivot pin 5, to a rotational member 30 which is rotationally mounted on a shaft 28 that is supported by a shift lever housing 1 (see FIG. 1), a support member 33 integrally formed on one end portion of the rotational member 30 so as to be extended in an upward direction, and a detent block 39 pivotally connected to an upper end of the support member 33 by a hinge pin 35.

The bracket 24 is formed having a pair of arms 23 and 23' that are formed on an open side of the bracket 24 approximately in the middle in a longitudinal direction of the bracket 24 such that a turnover spring 25 is installed between the arms 23 and 23'. The turnover spring 25 is a double torsion spring having offset ends and a flat portion 31 formed between two coiled portions 27 and 29. The turnover spring 25 is mounted to the arms 23 and 23' of the bracket 24 at its offset ends of the turnover spring 25 in order for the flat portion 31 to contact the detent block 39 such that the detent block 39 is biased.

The support member 33 is provided with a pair of pin supports 34 at ends of side walls thereof and two stoppers 37 and 37' at ends of front and rear walls in relation to the moving direction of the detent block 39, such that the detent block 39 is pivotally installed between the pin supports 34 by a pin 35 and its movement range is limited and defined by the front and rear stoppers 37 and 37'.

The detent block 39 is provided with a recess on its upper portion facing the turnover spring 25 such that the flat portion 31 of the turnover spring 25 is secured therein.

Figure 6:
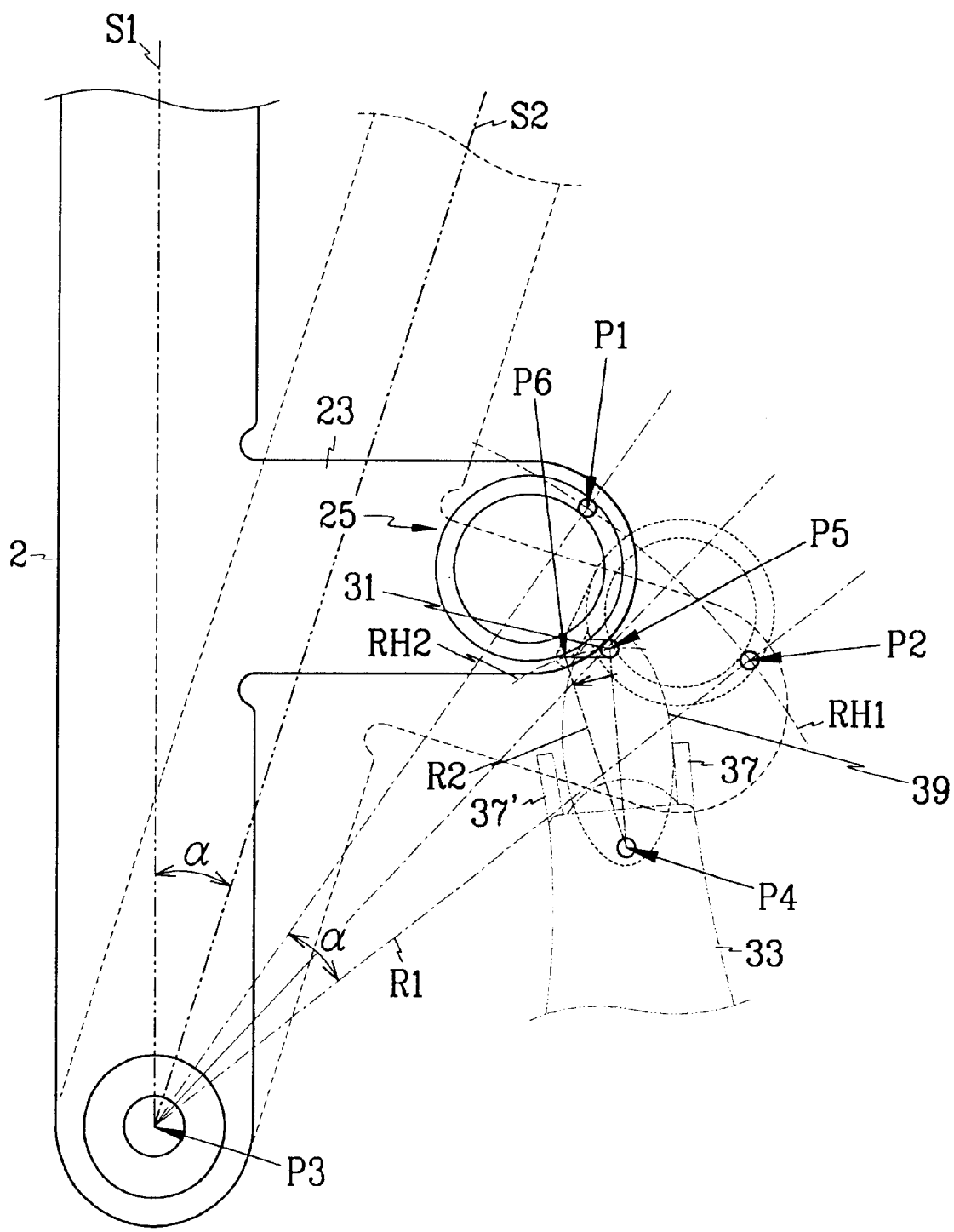
FIG. 6 is an operational view showing behavior of the detent mechanism of FIG. 5 while the shift lever moves from an automatic mode position to a manual mode position.

The operation of the detent mechanism according to the first preferred embodiment of the present invention will be described hereinafter with reference to FIG. 6, FIG. 7 and FIG. 8.

Reference numerals S1 and S2 refer to axes of the shift lever 2 when the shift lever 2 is positioned at the initially normal automatic mode and at the manual mode respectively.

If the shift lever 2 moves from the initial automatic mode position S1 to the manual mode position S2, the turnover spring 25 rotates on an axis of it's offset ends in a clockwise direction as well as revolves wholly along an arc RH1, which has a radius R1 extended from a point P3, from an initial point P1 to a point P2 by as much as an angle a in relation to the point P3, in the clockwise direction. At the same time, the flat portion 31 of the turnover spring 25 revolves along an arc RH2, which has a radius R2, from a point P5 to a point P6 in relation to a point P4 where the pin 35 is inserted, in a counter-clockwise direction, by overcoming an elastic force of the turnover spring 25.

When the shift lever 2 moves from the manual mode position to the automatic mode position, the turnover spring 25 is operated in an inverse order of the above automatic to manual shift mode conversion.

The points P5 and P6 on the arc RH2 along which the flat portion 31 of the turnover spring 25 passes is defined by the front and rear stoppers 37 and 37', which limit the pivot range of the detent block 39.

Now, the operation of the turnover spring and the detent block will be more precisely explained with reference to FIG. 7.

Figure 7:
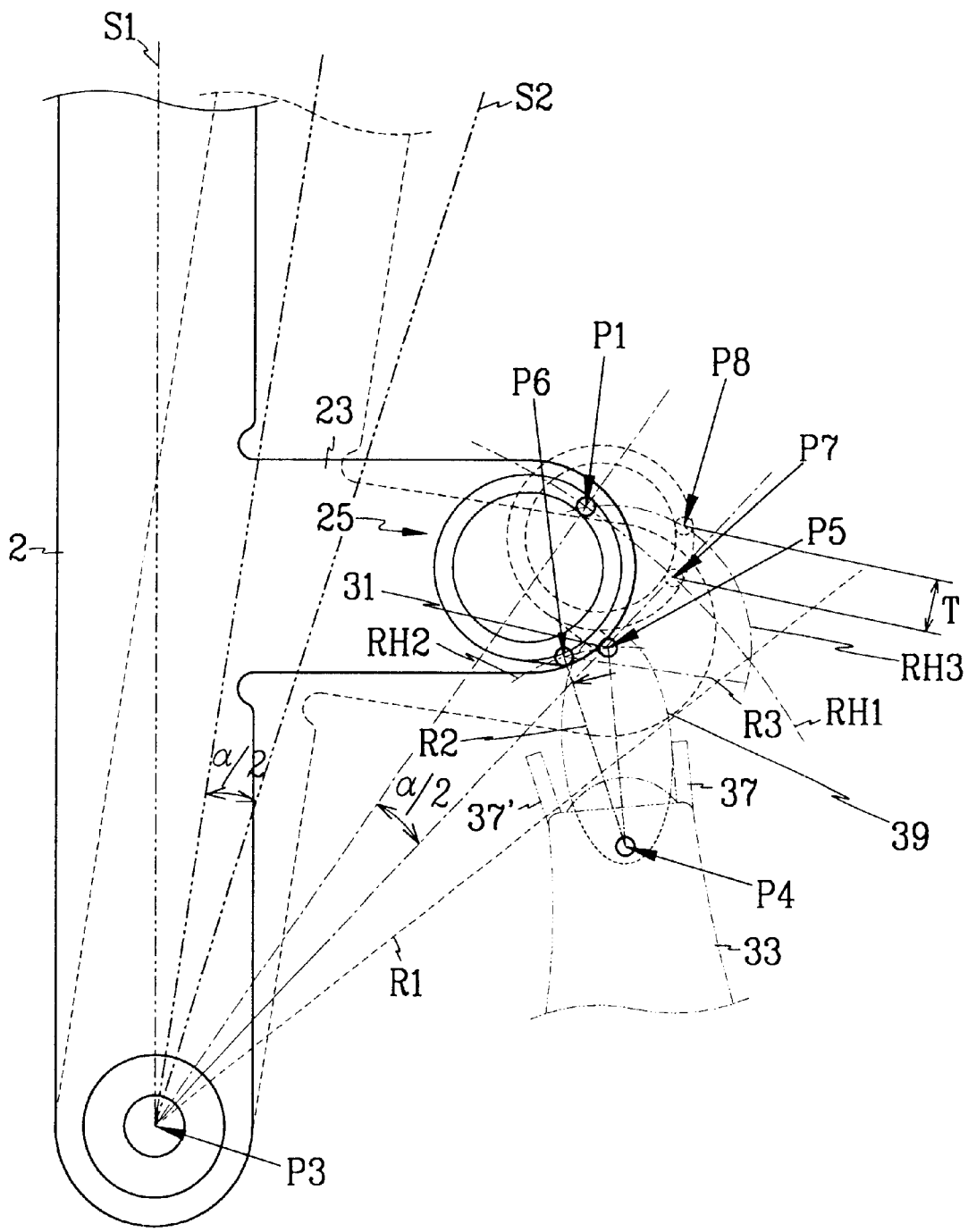
FIG. 7 is an operational view showing the behaviors of a detent block and a turnover spring of the detent mechanism of FIG. 5 while the shift lever moves from the automatic mode position to the manual mode position.

As shown in FIG. 7, while the shift lever 2 moves from the initial automatic mode position Si to the manual mode position S2, initially the flat portion 31 of the turnover spring 25 secured to the recess 41 of the detent block 39 revolves from its initial point P5 to the point P6 along the arc RH2 having a radius R2 in relation to a pivot point P4 so as to contact the front stopper 37. Also, while the shift lever 2 moves by as much as an angle α/2, the turnover spring 25 increases it's potential energy by winding upon itself as the axis of the offset ends of the turnover spring 25 moves from the point P1 to a turnover point P7. That is, the turnover spring 25 secures a torsion displacement T between the turnover point P7 and a point P8 which are on an arc RH3 having a radius R3, along which the axis of the offset ends of the turnover spring 25 passes unless the turnover spring 25 is held by the detent block 39.

Figure 8:
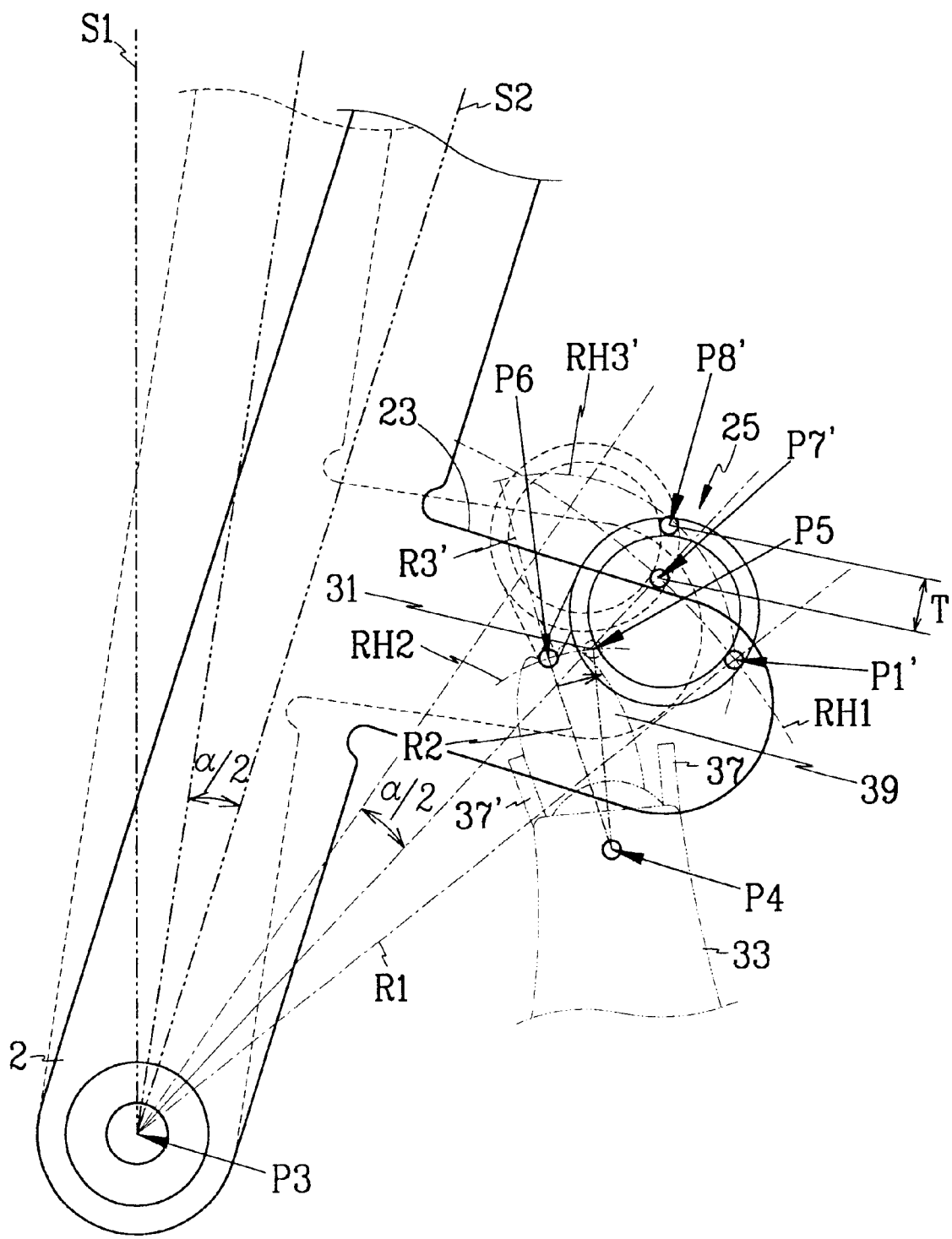
FIG. 8 is an operational view showing the behavior of the detent mechanism of FIG. 5 while the shift lever moves from the manual mode position to the automatic mode position.

In this case, if the shift lever 2 moves over more than an angle α/2, the detent block 39 is pushed in the opposite direction so as to be blocked by the rear stopper 37', and the turnover spring is relaxed (see FIG. 8).

On the other hand, while the shift lever 2 moves from the manual mode position S2 to the automatic mode position S1, the flat portion 31 of the turnover spring 25 revolves from the point P6 to the point P5 along the arc RH2 in relation to the pivot point P4. Also, while the shift lever 2 moves as much as the angle α/2, the turnover spring 25 increases it's potential energy by winding upon itself as the axis of the offset ends of the turnover spring 25 moves from the point P1' to a turnover point P7'. That is, the turnover spring 25 secures a displacement T between the turnover point P7' and a point P8', having the radius R3' in relation to a pivot point P6, along which the axis of the offset ends of the turnover spring 25 passes if the turnover spring 25 is not held by the detent block 39.

Figure 9:
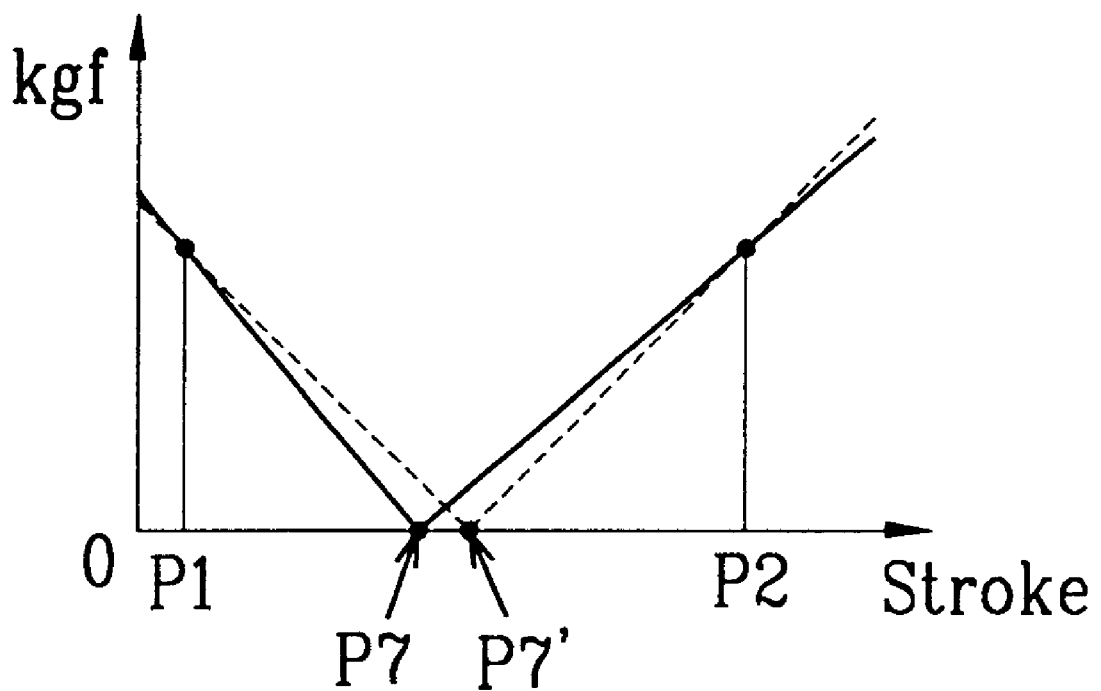
FIG. 9 is a graph showing characteristics of a turnover spring of the detent mechanism of FIG. 5.

FIG. 9 is a graph showing characteristics of the turnover spring of the detent mechanism.

As shown in FIG. 9, the turnover spring 25 is wound and relaxed whenever the shift lever 2 passes over the turnover point P7 and P7'. Since the turnover spring 25 and the detent block 39 cooperate in this way, the dual mode shift lever unit provides a driver with good detent quality when the shift lever 2 is manipulated in order to convert a present mode to the other mode.

A detent mechanism for a dual mode shift lever unit according to a second preferred embodiment of the present invention will be described hereinafter.

Figure 10:
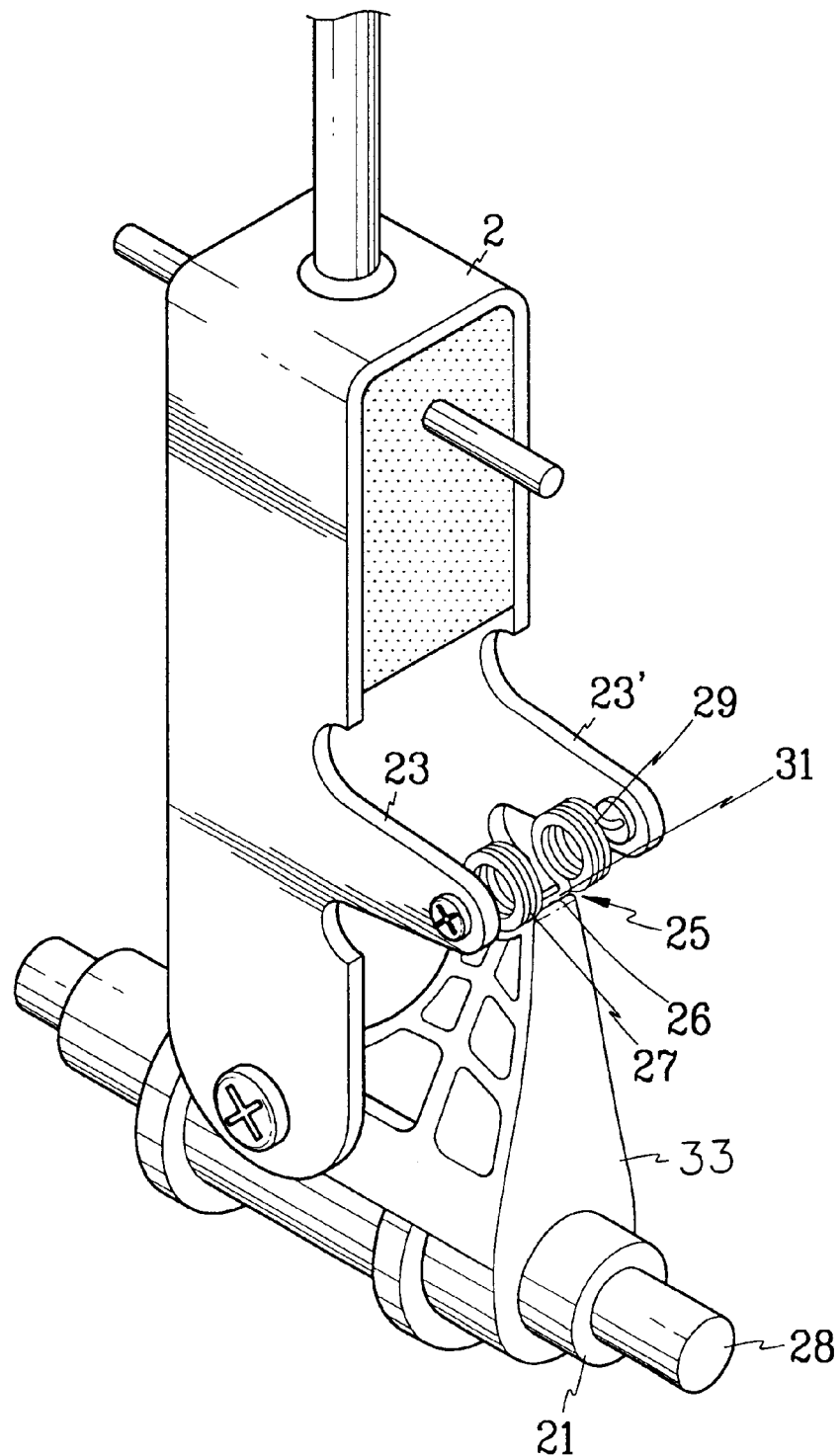
FIG. 10 is a perspective view showing a detent mechanism according to a second preferred embodiment of the present invention.

FIG. 10 is a perspective view showing a detent mechanism according to a second preferred embodiment of the present invention.

As shown in FIG. 10, the detent mechanism has the same configuration as the first preferred embodiment except that there is no detent block, but rather the support member 33 acts like the detent block.

The support member 33 is provided with a recess 26 at its upper end so as to receive the flat portion 31 of the turnover spring 25.

Figure 11:
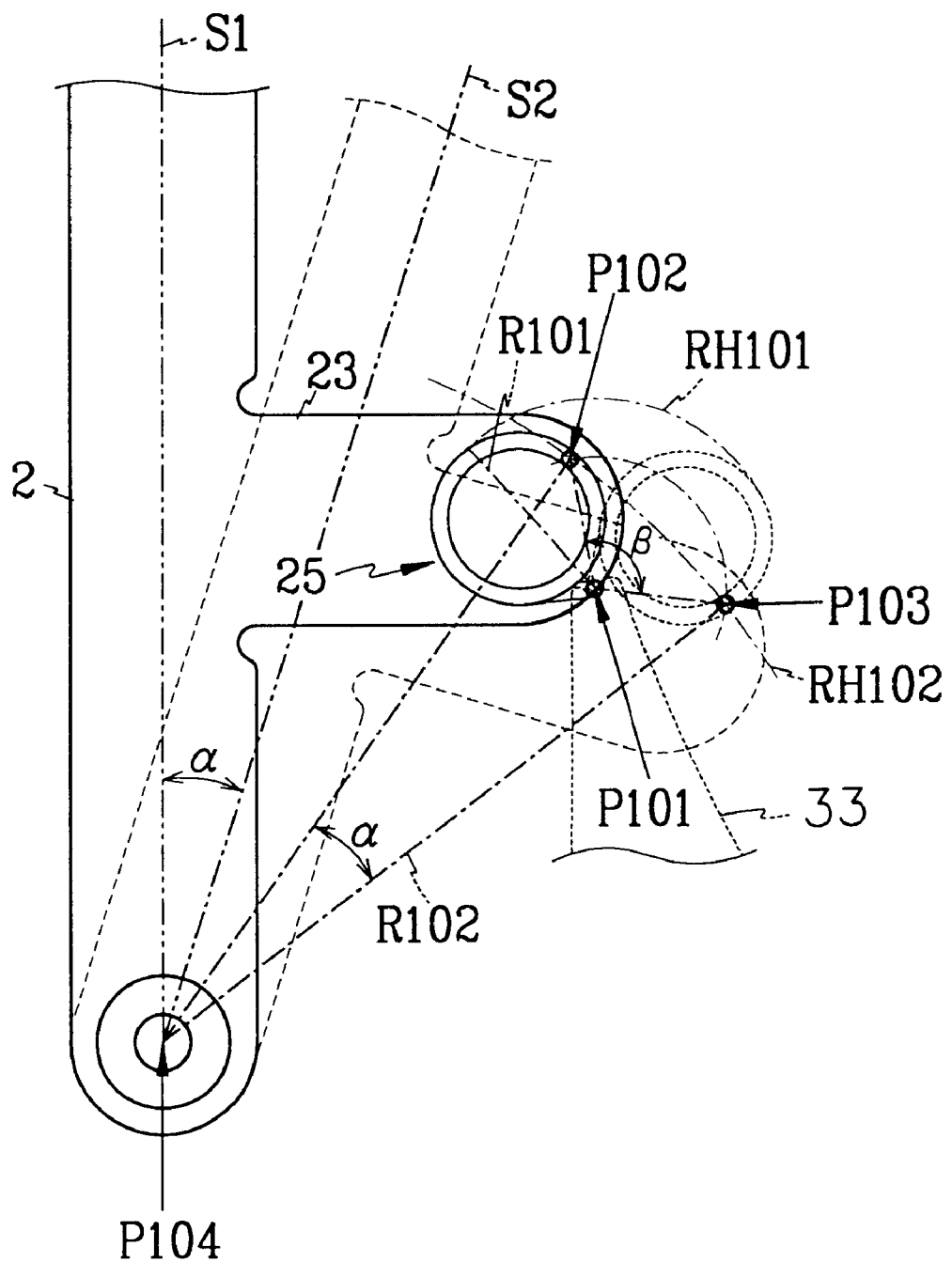
FIG. 11 is an operational view showing behavior of the detent mechanism of FIG. 10 while the shift lever moves from the automatic mode position to the manual mode position.

The operation of the detent mechanism according to the second preferred embodiment of the present invention will be described hereinafter with reference to FIG. 11 and FIG. 12.

If the shift lever 2 moves from the initial automatic mode position to the manual mode position, the turnover spring 25 rotates on an axis of the offset ends in a clockwise direction as well as wholly rolls over, forming an exterior arc RH101 which has a radius R101 in relation to the point P101.

At the same time, the axis of the offset ends moves from a point P102 to a point P103 by as much as an angle α along an arc RH102, having a radius R102 in relation to a pivot point P104 of the shift lever 2, in a clockwise direction.

Figure 12:
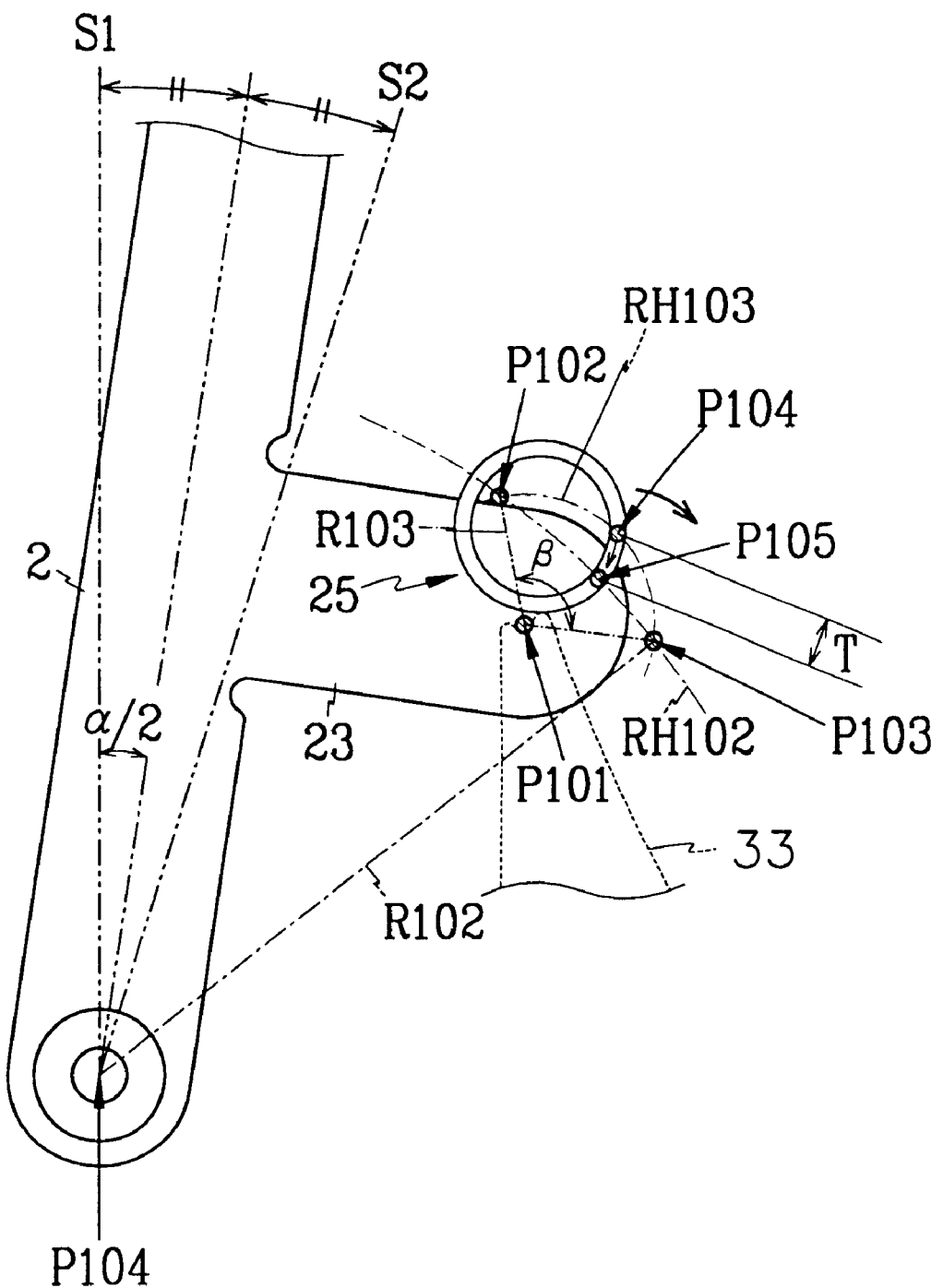
FIG. 12 is an operational view showing behavior of the detent mechanism of FIG. 10 at a turnover point.

As shown in FIG. 12, while the shift lever 2 moves as much as angle α/2, the turnover spring 25 increases it's potential energy by winding upon itself, and the axis of the offset ends of the turnover spring 25 moves from the point P102 to a turnover point P105. That is, the turnover spring 25 secures a torsion displacement T between the turnover point P105 and a point P104 which are on an arc RH103 having a radius R3, along which the axis of the offset ends of the turnover spring 25 passes if the turnover spring 25 is not held by its offset ends. Consequently, if the shift lever 2 moves over more than an angle α/2, the turnover spring 25 flops so as to be relaxed.

Figure 13:
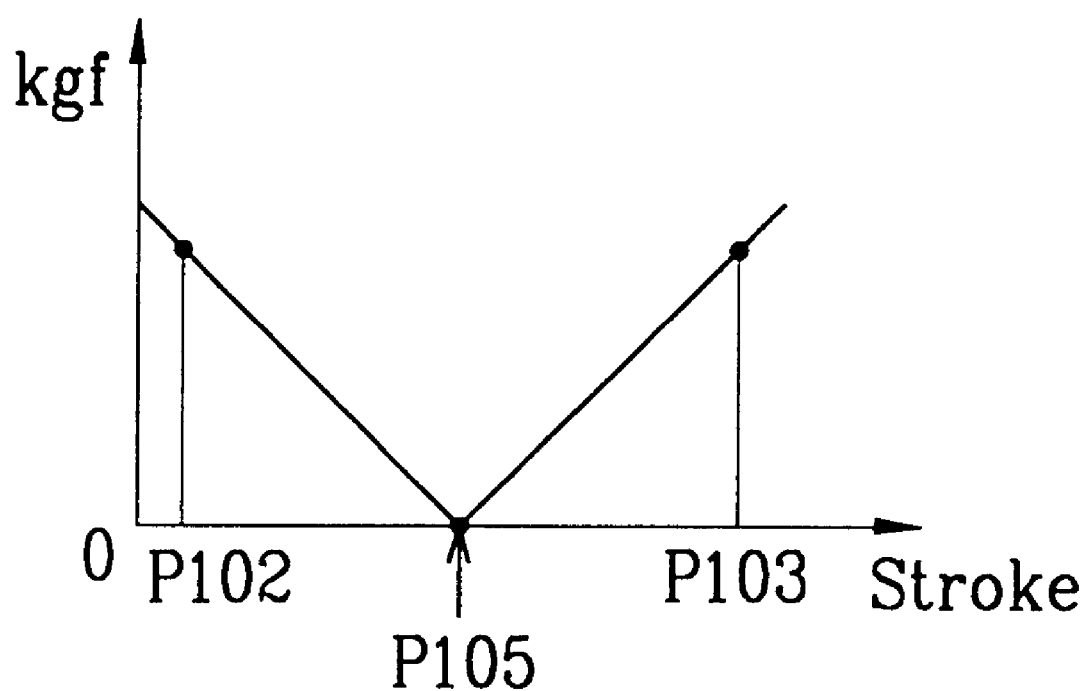
FIG. 13 is a graph showing characteristics of a turnover spring of the detent mechanism of FIG. 5.

As shown in FIG. 13, the turnover spring 25 is wound and relaxed whenever the shift lever 2 passes over the turnover point P105. Since the turnover spring 25 operates in this way, the dual mode lever unit according to the second preferred embodiment of the present invention provides a driver with a good detent quality when the shift lever 2 is manipulated in order to convert a present mode to the other mode.

As described above, the dual mode shift lever unit of the present invention is provided with a detent mechanism using the turnover spring which gets wound and then relaxed while passing over a turnover point such that the detent mechanism provides an improved detent quality during mode conversion operation.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A detent mechanism for a dual mode shift lever unit having a shift lever inserted into a housing through a guide groove formed on an indicator panel at an upper part of the housing, and a cable bracket pivotally supported by the housing and connected to a transmission manual valve which is responsively operated by shift lever manipulation, wherein the detent mechanism comprises, a bracket fixedly connected to a lower end of the shift lever and pivotally connected to a rotational member which is rotationally mounted on the pivot shaft supported by the shift lever housing, a detent block pivotally coupled to the rotational member, and a turnover spring installed on one open side of the bracket for contacting the detent block; and wherein the turnover spring is a double torsion spring having offset ends that are connected to and are in between the arms of the bracket, and a flat portion formed between two coiled portions, wherein the flat portion is contacted by the detent block.

2. A detent mechanism for a dual mode shift lever unit having a shift lever inserted into a housing through a guide groove formed on an indicator panel at an upper part of the housing, and a cable bracket pivotally supported by the housing and connected to a transmission manual valve which is responsively operated by shift lever manipulation, wherein the detent mechanism comprises, a bracket fixedly connected to a lower end of the shift lever and pivotally connected to a rotational member which is rotationally mounted on the pivot shaft supported by the shift lever housing, a detent block pivotally coupled to the rotational member, a turnover spring installed on one open side of the bracket for contacting the detent block, and further comprising a support member formed on an end portion of the rotational member, wherein the detent block is pivotally connected to an upper end of the support member.

3. A detent mechanism of claim 2 wherein the support member is provided with a pair of pin supports at ends of side walls and two stoppers at ends of front and rear walls in relation to a pivot direction of the detent block such that the detent block is pivotally installed between the pin supports by a pin.

4. A detent mechanism of claim 3 where in the detent block is limited in its pivot range by the front and rear stoppers.

5. A detent mechanism as recited in claim 3 wherein the support member is integrally formed on one end portion of the rotational member and extends in an upward direction.

* * * * *

UNITED STATES PATENT AND TRADEMARK OFFICE
CERTIFICATE OF CORRECTION

PATENT NO. : 6,553,858 B1
DATED : April 29, 2003
INVENTOR(S) : Hyung-Suk Kim

It is certified that error appears in the above-identified patent and that said Letters Patent is hereby corrected as shown below:

<u>Column 6,</u>
Lines 49 and 52, replace "claim 3" with -- claim 2 --.

Signed and Sealed this

Eighth Day of June, 2004

JON W. DUDAS
*Acting Director of the United States Patent and Trademark Office*